Figure 1:
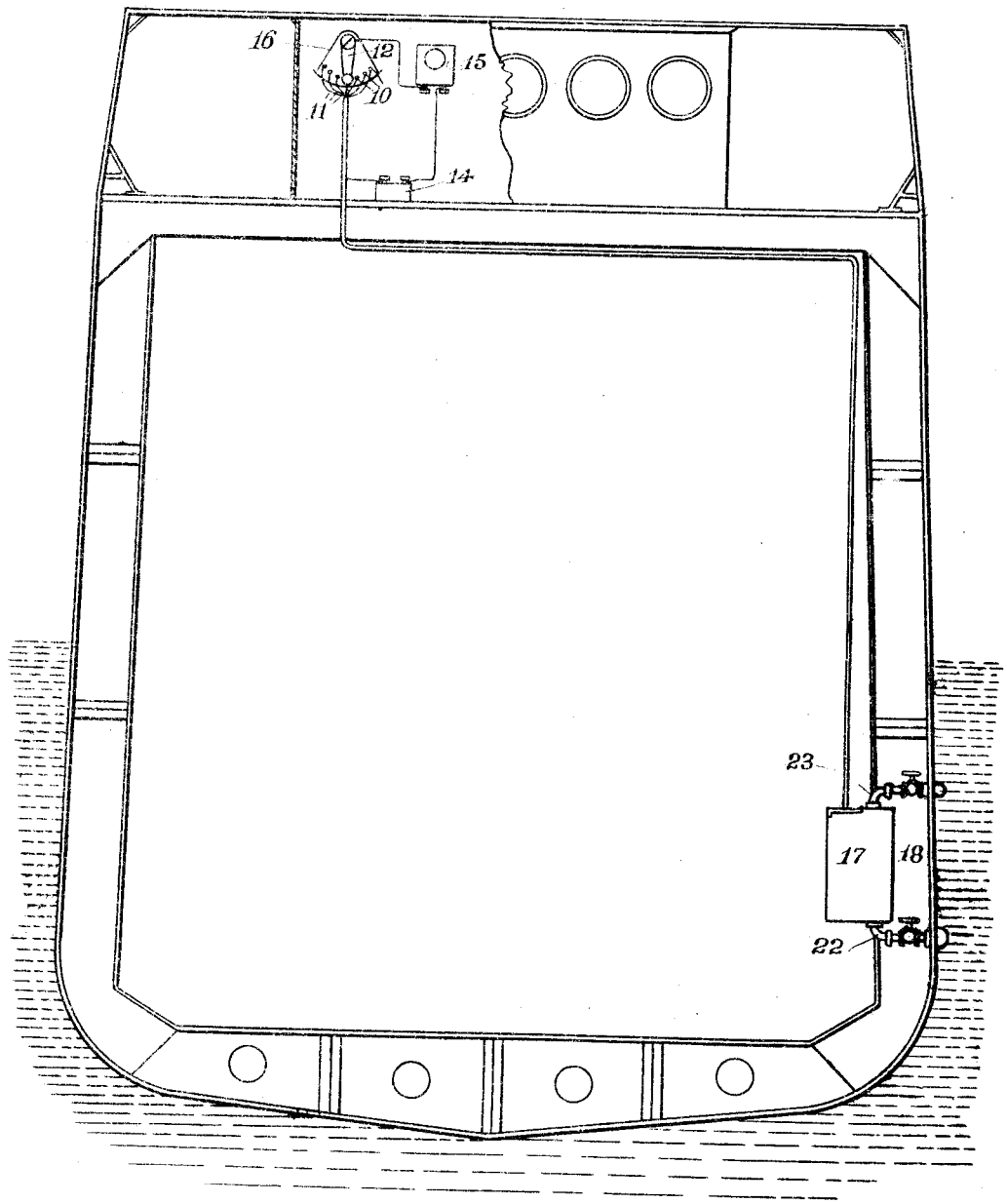

A. McNAB.
AUDIBLE SIGNAL FOR DETERMINING THE TEMPERATURES OF SEA WATER.
APPLICATION FILED APR. 25, 1912.

1,062,292.

Patented May 20, 1913.

A. McNAB.
AUDIBLE SIGNAL FOR DETERMINING THE TEMPERATURES OF SEA WATER.
APPLICATION FILED APR. 25, 1912.
1,062,292.
Patented May 20, 1913.
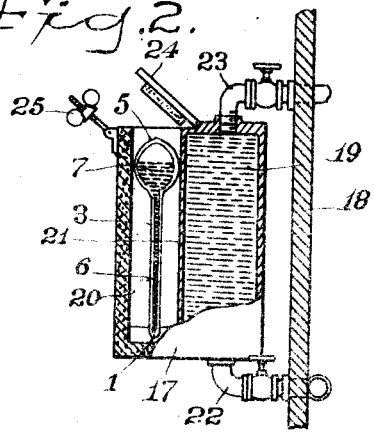
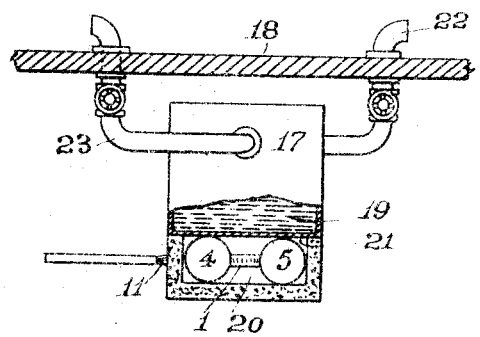
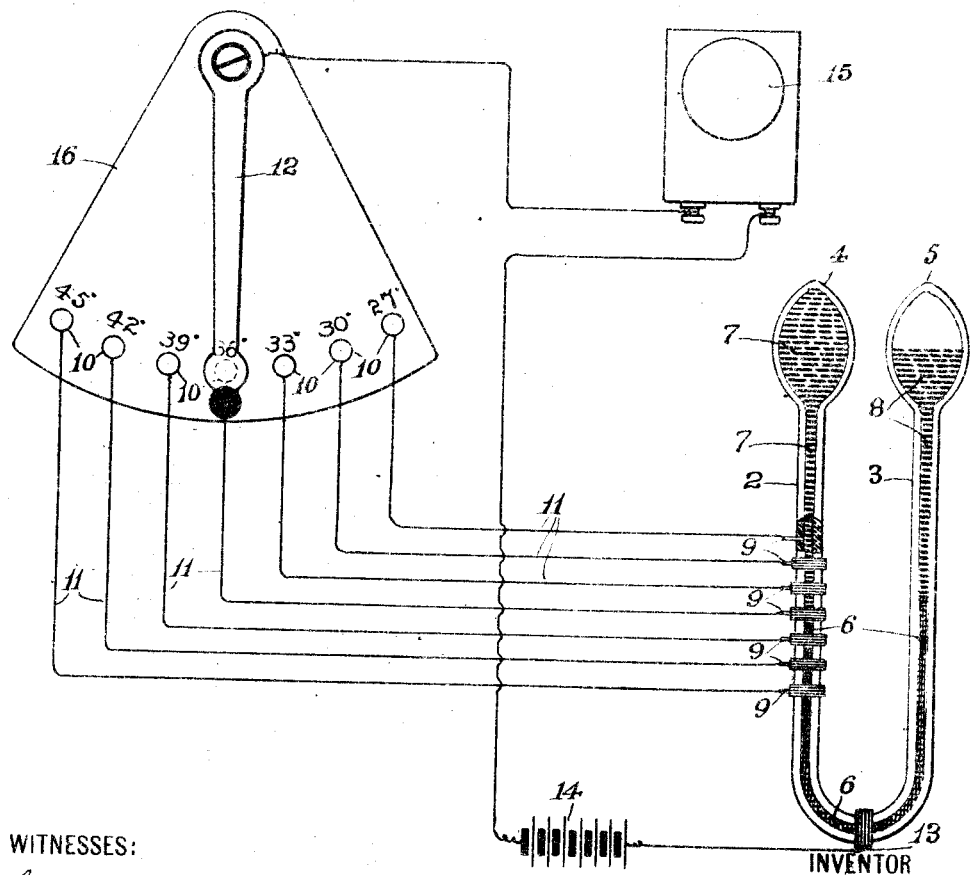

UNITED STATES PATENT OFFICE.

ALEXANDER McNAB, OF BRIDGEPORT, CONNECTICUT, ASSIGNOR TO THE McNAB COMPANY, OF BRIDGEPORT, CONNECTICUT, A CORPORATION OF CONNECTICUT.

AUDIBLE SIGNAL FOR DETERMINING THE TEMPERATURES OF SEA-WATER.

1,062,292. Specification of Letters Patent. Patented May 20, 1913.

Application filed April 25, 1912. Serial No. 693,211.

*To all whom it may concern:*

Be it known that I, ALEXANDER McNAB, a subject of George V, King of Great Britain, and residing in the city of Bridgeport, county of Fairfield, State of Connecticut, United States of America, have invented certain new and useful Improvements in Audible Signals for Determining the Temperatures of Sea-Water; and I do declare the following to be a full, clear, and exact description of the invention, such as will enable others skilled in the art to which it appertains to make and use the same.

My invention relates to certain improvements in audible signals for determining the temperatures of sea water, and has for its object to provide a simple and effective device of this description, and with this end in view my invention consists in certain details of construction and combination of parts hereinafter fully described and then particularly pointed out in the claims which conclude this description.

In the accompanying drawing Figure 1 represents a cross section of a ship equipped with my improvement. Fig. 2 is a vertical sectional elevation of the thermal chamber. Fig. 3 a plan view of such chamber with the upper wall thereof partly sectioned away, and Fig. 4 is a schematic view illustrating the manner in which my improvement is installed.

Similar numerals of reference denote like parts in the several figures of the drawing. 1 is a U-shaped tube of glass whose legs 2, 3, extend vertically and terminate respectively in enlarged hermetically sealed bulbs 4, 5. This tube is partly filled at the lower portion with mercury denoted by the numeral 6, the leg 2 above the mercury column and its bulb 4 being filled with a liquid that is a non-conductor of electricity, such as creosote, denoted by the numeral 7, while the leg 3 above the mercury column is filled with creosote, denoted by the numeral 8, which only partway fills the bulb 5 to provide room for the expansion of the liquids.

Extending within the leg 2 to the interior thereof are spaced platinum points 9 which are electrically and separately connected to insulated spaced contacts 10 by means of wires 11. 12 is an insulated pivoted switch lever which may be moved against any one of these contacts 10.

13 is a platinum point which extends within the tube 1 at the bottom to the interior thereof, and this point is therefore always in contact with the mercury in said tube.

14 represents a battery one pole of which is connected to the platinum point 13 while the other pole is connected to one terminal of an electric bell 15 the other terminal of said bell being connected to the lever 12.

The contacts 10 are preferably arranged on a block 16 of insulating material and each contact is denoted by a degree of temperature, the contact denoting the highest temperature being connected with the lowermost of the platinum points 9, while the contact denoting the lowest temperature is connected with the highest platinum point 9.

The U-tube, containing mercury and creosote as described, constitutes a thermometer, since the creosote will contract at low temperatures and will expand at warm high temperatures, and any contraction of the creosote within the leg 2 and bulb 7 will cause the column of creosote in said leg to shorten whereupon the mercury in said leg will rise and will come into contact with one or more of the higher platinum points 9.

The operation of my improvement is as follows: Presupposing the lever 12 to be on the contact which is marked at 36° there will be no alarm from the bell because the column of mercury in the leg 2 is not in contact with the platinum point that is connected to said contact, but should said lever be shifted to the contact marked 39° the circuit will be closed and the alarm will sound because the mercury in said leg is in contact with the platinum point that is connected to this last mentioned contact.

Should a vessel be approaching a region where icebergs abound, the temperature of the sea water will become lower, and it therefore becomes quite necessary that the officer in charge of a ship should be advised as to such temperature. If the officer shifts the lever 12 to one of the contact points, for instance, the one marked 42°, and the alarm does not sound, this will indicate that there is no particular danger since the temperature of the water is not alarmingly low, but should the alarm sound with the lever on said contact, and should it continue to sound when the lever was placed successively against the contacts marked 39° and 36°, the officer would be advised that precautions should be taken against icebergs, and should the alarm continue to sound when the lever was shifted against the contact marked 33°, he would know that he was in the near presence of ice and he would take precautions accordingly.

By constantly shifting the lever against various contacts the ship's captain or other officer may be constantly posted as to the temperature of the sea water, and therefore will have due warning of dangerous conditions brought about by the presence of icebergs.

I have shown a block 16 provided with the contacts that provide for differences of only three degrees but of course it will be readily understood that the platinum points 9, as well as the contacts 10, may be multiplied so as to give changes of temperature in degrees, without departing from the spirit of my invention.

In order to place the tube 1 where it will be highly sensitive to changes in the temperature of the sea water, I provide a chamber 17 which is preferably secured to one side of the ship at a suitable distance below the sea level, represented by the numeral 18, this chamber being divided into two compartments 19, 20, by means of a thin partition of metal 21, such as copper. One of these compartments 19 is larger than the other and always contains circulating sea water, the bottom of said compartment having a pipe 22 extending therefrom and opening outside the vessel directly into the sea, this outside portion of the pipe extending toward the bow of the ship so that as the ship travels the water will be forced through this pipe into the chamber 17, the upper part of said chamber being provided with a pipe 23 which merely extends through the side of the vessel and preferably points toward the stern of the ship, and serves as the outlet for the water in said chamber as it is forced therethrough during the movement of the ship.

The U-tube is within the compartment 20 and since the partition 21 is exceedingly thin and is a most excellent conductor of heat, the contents of the tube will be very sensitive and will quickly respond to changes of temperature.

In order that the compartment 20 may not be affected by outside temperature all the external walls are made thick and contain any suitable material that is a non-conductor of heat and cold, this compartment being closed by a suitable cover 24 that is fastened down securely by any ordinary device 25.

Various alarms may be installed in circuit throughout the ship, such as the captain's room, the chart room, the bridge, pilot house, &c., so that if the lever 12 is against a contact which would indicate a low temperature of the water ample warning will be given in various portions of the ship.

Of course it will be understood that creosote is a non-conductor of electricity, and therefore it will not close a circuit by coming in contact with one of the platinum points.

Having thus described my invention what I claim as new and desire to secure by Letters Patent is:—

1. A device of the character described, comprising a closed chamber secured within a ship at a location below the surface of the sea and divided into two compartments by a thin partition made of a substance that is a good conductor of heat, one compartment having inlet and outlet communications whereby sea water is admitted and discharged, the other compartment having all its walls especially constructed whereby the interior of said compartment will not be affected by external temperatures, a U-shaped tube of glass secured within this last mentioned compartment and having legs which are vertically disposed and terminate in hermetically sealed large bulbs, said tube being partly filled with mercury, the leg and its bulb above one column of mercury being completely filled with creosote while the other leg and bulb are only partially filled with creosote, in combination with a series of spaced platinum points extending within the completely filled leg to the interior thereof, insulated contacts, connections between said points and said insulated contacts, an insulated switch lever adapted to be swung against said contacts, a battery, a platinum point extending within the bottom of said tube in contact with the mercury and connected to one pole of said battery the other pole being connected to the switch lever, and an electric alarm bell interposed in the circuit between said lever and battery.

2. A device of the character described comprising a closed chamber secured within a ship and divided into two compartments by a thin partition made of a substance that is a good conductor of heat, one compartment having inlet and outlet communications whereby sea water is admitted and discharged, a U-shaped tube of glass secured within the other compartment and having legs which are vertically disposed and terminate in hermetically sealed large bulbs, said tube being partly filled with mercury, the leg and its bulb above one column of mercury being completely filled with creosote while the other leg and bulb are only partially filled with creosote, in combination with a series of spaced platinum points extending within the completely filled leg to the interior thereof, insulated contacts, connections between said points and contacts, an insulated switch lever adapted to be swung against said contacts, a battery, a platinum point extending within the lower portion of said tube at a point below the first named platinum points and connected to one pole of said battery, the other pole of the battery being connected to the switch lever, and an electric signal interposed in the circuit between said lever and battery.

3. A water temperature annunciator comprising a receptacle, a heat conducting partition dividing the receptacle into compartments, means for admitting water to one of the compartments, means for discharging water therefrom, an expansible liquid thermometer in the other compartment, a plurality of electricity conducting points in the path of contractile movement of the liquid in the thermometer, an insulated support provided with contacts corresponding in number with the points, circuit connections between the points and contacts, a manually operable switch carried by the support and adapted for selective engagement with the contacts, a battery, an alarm, and a circuit connection between the thermometer, battery, switch, and alarm.

4. A sea water temperature annunciator comprising a receptacle adapted to be carried by a ship and disposed below the plane of the surface of the sea, means for discharging sea water into the receptacle, means for discharging sea water therefrom, a thermometer in the receptacle, means for preventing the water contacting with the thermometer but permitting the temperature of the water to affect the thermometer, a signal, an electric circuit including the thermometer and signal, a source of electrical energy in said circuit, and manually operable means for controlling the circuit.

5. A sea water temperature annunciator comprising a receptacle adapted to be carried by a ship and disposed in a plane below the plane of the surface of the sea, means for admitting sea water to the receptacle, means for discharging sea water therefrom, means for insulating the receptacle from the heat of the ship, an indicator in the receptacle, means for insulating the indicator from the water in the receptacle but permitting the same to be affected by the temperature thereof, an alarm, a source of electricity, a circuit including the source of electricity, the indicator, and the alarm, and manually operable means for controlling the circuit.

6. A sea water temperature annunciator comprising a receptacle carried by a ship and provided with a heat conducting partition dividing the receptacle into a water compartment and a thermometer compartment, means for admitting sea water at sea water temperature to the sea water compartment, a thermometer in the thermometer compartment, circuit connectors carried by the thermometer, an insulated support provided with contacts corresponding in number to the connectors of the thermometer, an electric circuit including a battery, a signal, and the thermometer, and manually operable means in said circuit adapted for selective engagement with the contacts.

7. A sea water temperature annunciator comprising a receptacle carried by a ship and divided into a water compartment and a water-tight thermometer compartment, means for admitting sea water to the water compartment at sea water temperature, a thermometer in the thermometer compartment, a signal, means actuated by the thermometer for operating the signal, and manually operated means for controlling the signal.

8. A sea water temperature annunciator comprising a receptacle carried by a ship and provided with a heat conducting water-tight partition dividing the receptacle into a water compartment and a temperature indicator compartment, means for circulating sea water through the water compartment at sea water temperature, a temperature indicator in the indicator compartment and affected by the temperature of the water in the water compartment, signaling mechanism operated by the indicator, and controlling means for said mechanism.

9. A sea water temperature annunciator comprising a receptacle carried by a ship and provided with a water-tight temperature conducting partition dividing the receptacle into a water compartment and a temperature indicator compartment, means for circulating sea water through the water compartment at sea water temperature, a temperature indicator in the indicator compartment and subjected to the influence of the temperature of the water in the water compartment, a signal, and means actuated by the indicator for operating the signal.

In testimony whereof I affix my signature in presence of two witnesses.

ALEXANDER McNAB.

Witnesses:
F. W. SMITH, Jr.,
M. T. LONGDEN.